United States Patent
Ragavan et al.

(10) Patent No.: US 12,399,843 B2
(45) Date of Patent: Aug. 26, 2025

(54) INTELLIGENT WORKSPACE CONNECTION ASSISTANCE

(71) Applicant: Dell Products, L.P., Round Rock, TX (US)

(72) Inventors: Srinivasa Ragavan, Bangalore (IN); Gokul Thiruchengode Vajravel, Bangalore (IN); Vivek Viswanathan Iyer, Saint Johns, FL (US)

(73) Assignee: Dell Products, L.P., Round Rock, TX (US)

( * ) Notice: Subject to any disclaimer, the term of this patent is extended or adjusted under 35 U.S.C. 154(b) by 177 days.

(21) Appl. No.: 18/302,035

(22) Filed: Apr. 18, 2023

(65) Prior Publication Data

US 2024/0354264 A1  Oct. 24, 2024

(51) Int. Cl.
*G06F 13/10* (2006.01)
*G06F 13/42* (2006.01)

(52) U.S. Cl.
CPC ............ *G06F 13/102* (2013.01); *G06F 13/42* (2013.01)

(58) Field of Classification Search
CPC ............................... G06F 13/42; G06F 13/102
See application file for complete search history.

(56) References Cited

U.S. PATENT DOCUMENTS

| | | | | |
|---|---|---|---|---|
| 6,832,271 | B1 * | 12/2004 | Ivan | H04L 41/22 715/737 |
| 7,797,416 | B2 * | 9/2010 | Kinoshita | G06F 13/387 715/735 |
| 8,078,973 | B1 * | 12/2011 | Luttmann | G06F 3/0629 715/965 |
| 2020/0356417 | A1 * | 11/2020 | Murphy | H04L 47/125 |

* cited by examiner

*Primary Examiner* — Zachary K Huson
(74) *Attorney, Agent, or Firm* — Fogarty LLP

(57) ABSTRACT

Systems and methods for providing intelligent workspace connection assistance are described. In an embodiment, an Information Handling System (IHS) may include a processor and a memory coupled to the processor, the memory having program instructions stored thereon that, upon execution, cause the IHS to: enumerate a plurality of peripheral devices coupled to a plurality of ports of the IHS; identify a Key Performance Indicator (KPI) for each of the plurality of peripheral devices; weigh each of the KPIs by a corresponding value scaler; and calculate a connection recommendation for the plurality of peripheral devices based, at least in part, upon the weighed KPIs.

19 Claims, 4 Drawing Sheets

INTELLIGENT WORKSPACE CONNECTION ASSISTANCE

FIELD

This disclosure relates generally to Information Handling Systems, and, more specifically, to systems and methods for providing intelligent workspace connection assistance.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for providing intelligent workspace connection assistance are described. In an illustrative, non-limiting embodiment, an Information Handling System (IHS) may include a processor and a memory coupled to the processor, the memory having program instructions stored thereon that, upon execution, cause the IHS to: enumerate a plurality of peripheral devices coupled to a plurality of ports of the IHS; identify a Key Performance Indicator (KPI) for each of the plurality of peripheral devices; weigh each of the KPIs by a corresponding value scaler; and calculate a connection recommendation for the plurality of peripheral devices based, at least in part, upon the weighed KPIs.

In some cases, the plurality of peripheral devices may include at least one of: a docking station, a display, a projector, a camera, a microphone, a loudspeaker, headphones, a keyboard, a mouse, a scanner, a printer, a smartwatch, a smartphone, or a tablet. The plurality of ports may include at least one of: Universal Serial Bus (USB) Type-A, USB Type-B, USB Type-C, Lightning, Firewire, Thunderbolt, DisplayPort, High-Definition Multimedia Interface (HDMI), Digital Visual Interface (DVI), or Serial Advanced Technology Attachment (SATA).

To enumerate the plurality of peripheral devices, the program instructions, upon execution, may cause the IHS to discover at least one single composite peripheral device comprising two or more of the plurality of ports. The composite peripheral device may include at least one of: a docking station, a display, or a hub.

The KPI may include at least one of: a power budget, or a communication bandwidth. The value scaler for each corresponding one of the plurality of devices may include a metric indicative of at least one of: a number of available ports, a port direction, or a mobility preference.

To calculate the connection recommendation, the program instructions, upon execution, may cause the IHS to perform a knapsack algorithm using the weighed KPIs. The knapsack algorithm may be bounded by a maximum KPI value for the connection recommendation.

The connection recommendation may include an instruction to decouple a first peripheral device from a first port and to couple the first peripheral device to a second port. Additionally, or alternatively, the connection recommendation may include an instruction to decouple a second peripheral device from the second port and to couple the second peripheral device to the first port.

The program instructions, upon execution, may cause the IHS to: enumerate another plurality of peripheral devices in response to an addition of a new peripheral device or removal of an existing peripheral device from the plurality of peripheral devices; and calculate another connection recommendation for the other plurality of peripheral devices based, at least in part, upon at least one other weighed KPI.

The connection recommendation may include a suggestion to replace a first peripheral device with a second peripheral device of a same type of as the first peripheral device, and the first and second peripheral devices may be coupled to the IHS using different ports.

In another illustrative, non-limiting embodiment, a method may include: identifying a KPI for each of a plurality of peripheral devices coupled to a plurality of ports of an IHS, and calculating a connection recommendation for the plurality of peripheral devices based, at least in part, upon the KPIs weighed by corresponding value scalers.

Each value scaler, for each of the plurality of peripheral devices, may include a metric indicative of at least one of: a number of available ports, a port direction, or a mobility preference. Moreover, calculating the connection recommendation may include performing a knapsack algorithm using the weighed KPIs. The knapsack algorithm may be bounded by a maximum KPI value.

In yet another illustrative, non-limiting embodiment, a memory storage device may have program instructions stored thereon that, upon execution by an IHS, cause the IHS to identify a KPI for each of a plurality of peripheral devices coupled to a plurality of ports of the IHS; and calculate a connection recommendation for the plurality of peripheral devices based, at least in part, upon the KPIs weighed by corresponding value scalers.

Each value scaler, for each of the plurality of peripheral devices, may include a metric indicative of at least one of: a number of available ports, a port direction, or a mobility preference. To calculate the connection recommendation, the program instructions, upon execution, may cause the IHS to perform a knapsack algorithm using the weighed KPIs and bounded by a maximum KPI value.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
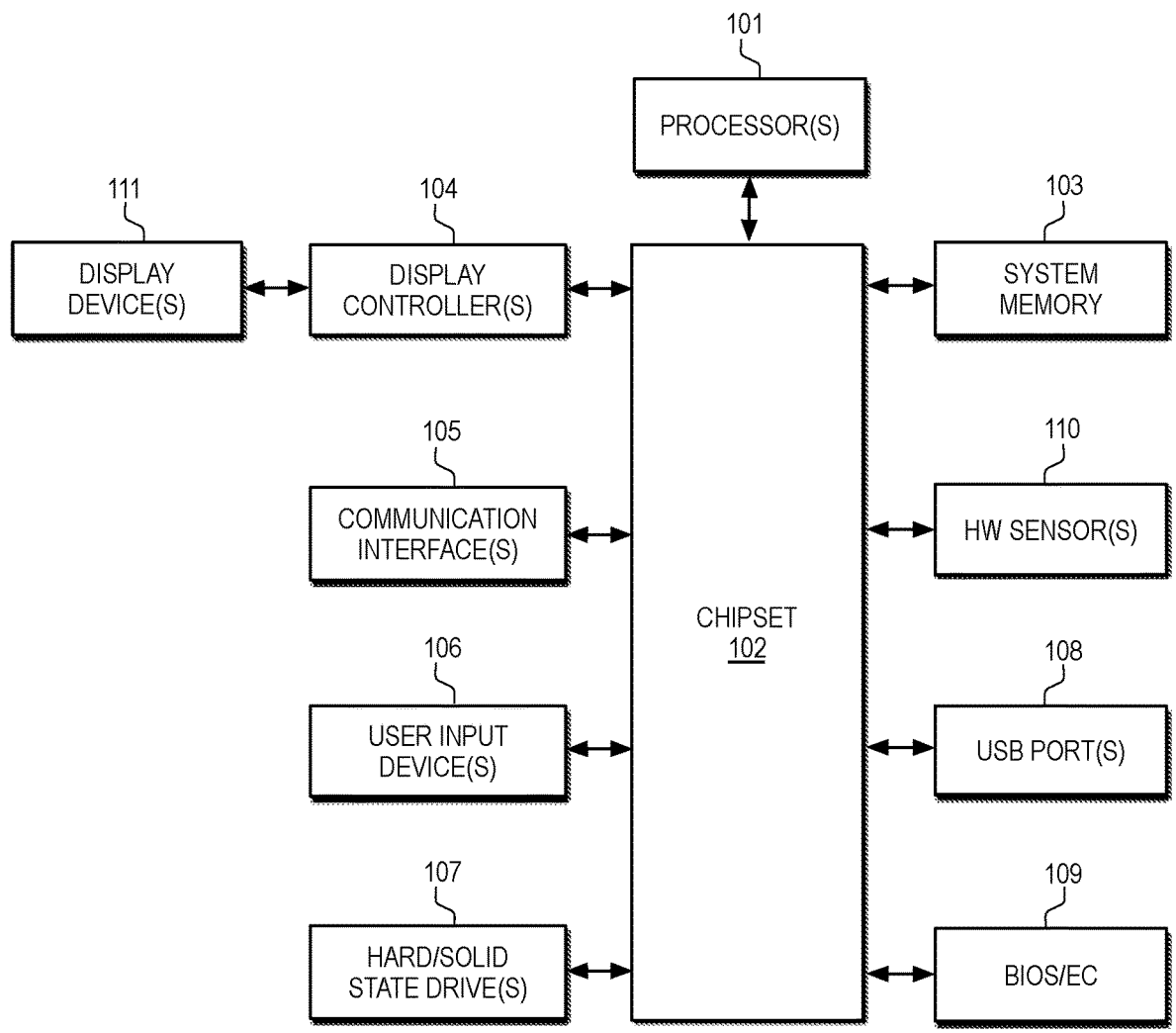
FIG. 1 depicts a block diagram of examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In the context of IHSs, each workspace (e.g., an office, a conference room, a home office, a shared workspace, etc.) may include its own distinct set of peripheral devices (e.g., an external camera or webcam, an external microphone, an external speaker, a keyboard, a mouse, a printer, etc.). When a user (or employee) arrives at a workspace, they may bring their IHSs into the workspace and then choose between using: (a) peripheral devices integrated into their IHS, or (b) external peripheral devices found in that workspace.

In some cases, when a user arrives at a particular workspace, they may couple their IHS to one or more peripheral devices via a Workspace Managing Device (WMD) such as a dock, docking station, intelligent hub, external display, wireless KVM, or other IHS. Additionally, or alternatively, the IHS may be directly coupled to one or more peripheral devices using any suitable wired or wireless communication protocol. Yet additionally, or alternatively, a workspace may be served by one of a plurality of distributed Access Points (APs) for network/Internet connectivity, such as wireless routers or the like.

In various embodiments, systems and methods described herein may provide intelligent workspace connection assistance configured to produce connection recommendations among a user's IHS, WMD devices, and/or peripheral devices found in a given workspace.

For example, in a first hypothetical scenario, a user may wish to setup their workspace with optimal connection of peripherals devices for better performance. The user may want to setup a home office with purchased peripherals, such as a wireless keyboard, a wireless mouse, and a docking station coupled to two displays, a puck speakerphone, a webcam, and a printer. Ordinarily, the user would be responsible for analyzing all the available ports (e.g., Universal Serial Bus or "USB" Type-A, USB Type-B, USB Type-C, Lightning, Firewire, Thunderbolt, DisplayPort, High-Definition Multimedia Interface or "HDMI," Digital Visual Interface or "DVI," Serial Advanced Technology Attachment or "SATA," audio jacks, etc.) on the docking station, IHS, speakerphone, etc., and then manually identifying and connecting the devices to the proper ports or interfaces. As an unfortunate part of this process, the user may inadvertently connect devices to incompatible or low performance ports, thus leading to peripheral performance degradation (e.g., a 4K webcam connected to a USB 2.0 port).

In a second hypothetical scenario, a user may purchase a new peripheral and wish to recalibrate their workspace connections for better performance. For example, the user may purchase a new USB-C monitor that supports additional USB ports. In such a scenario, the user would have to evaluate the available ports and potentially adjust the existing connections multiple times across their peripheral devices. Again, the user may connect devices to incompatible or low performance ports, often in a daisy chain that leads to performance degradation.

In a third hypothetical scenario, a user may want all of their peripherals to be connected optimally based on usage, for better performance and/or improved user-experience. To that end, the user may keep connecting and disconnecting a few USB devices during the day (e.g., USB Hard drives/ Thumb drives, mobile data cable, debugger etc.). Ordinarily, the user would need to identify the permanently connected devices and connect them to a docking station, yet the user may adjust the connections multiple times to accommodate peripherals devices with available ports. As a result of a frequent switching of devices, the user may connect devices to incompatible or low performance ports, thus inadvertently worsening their experience.

In a fourth hypothetical scenario, a user may want to calibrate their workspace connection with the goal of improved power budgeting. For example, the user may purchase a new Ultra-High Definition (UHD) 4K USB-C monitor. If the monitor is connected directly to the IHS, however, when the IHS is not connected to an AC power source, such a connection may lead to performance degradation.

In each of these scenarios, to prevent the user from continuing to use low performing ports, reconnecting low performing devices through trial-and-error, and/or having to become more technical about the connecting devices, the inventors hereof have recognized a need for an Operating System (OS) (e.g., WINDOWS, MACOS, iOS, ANDROID, LINUX, etc.), peripheral device, communication port, and protocol independent framework for discovering and managing workspace connections. In various embodiments, these system and methods may be used to ensure better connectivity across an IHS and various peripheral devices.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. In some cases, communication interface(s) 105 may be used to communicate with peripheral devices (e.g., displays, speakers, microphones, headsets, docking stations, printers, etc.). Moreover, communication interface(s) 105 may be coupled to chipset 102 via a Peripheral Component Interconnect Express (PCIe) bus, or the like.

Chipset 102 may be coupled to display controller(s) 104, which may include one or more or graphics processor(s) (GPUs) on a graphics bus, such as an Accelerated Graphics Port (AGP) or PCIe bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as two or more discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable the instantiation of an intelligent workspace connection assistant, as described in more detail below.

Chipset 102 may also provide access to one or more hard disk and/or solid-state drives 107. In certain embodiments, chipset 102 may also provide access to one or more optical drives or other removable-media drives. In certain embodiments, chipset 102 may provide access to one or more USB ports 108, to which one or more peripheral devices may be coupled (e.g., internal or external webcams, microphones, speakers, docking stations, displays, etc.).

Chipset 102 may further provide access to one or more user input devices 106, for example, using a super I/O controller or the like. Examples of user input devices 106 include, but are not limited to, a keyboard, mouse, touchpad, stylus or active pen, dial totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component and may compare it against the reference hash value to determine if any modifications have been made to the component, thus indicating that the component has been compromised. In this manner, EC 109 may validate the integrity of hardware and software components installed on IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip (SoC). As such, in certain embodiments, IHS 100 may be implemented as different classes of computing devices including, but not limited to: servers, workstations, desktops, laptops, appliances, video game consoles, tablets, smartphones, etc.

Figure 2:
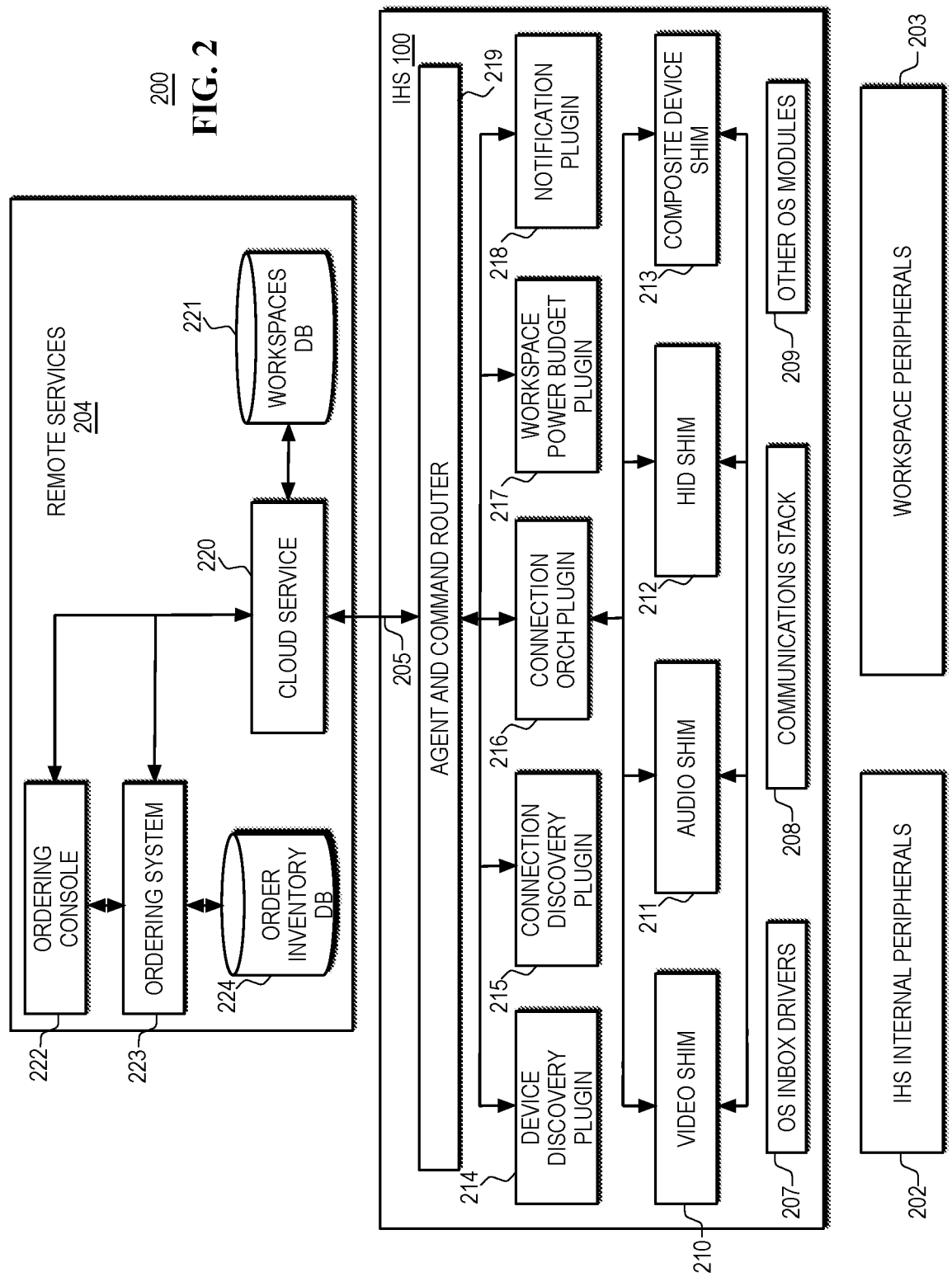
FIG. 2 depicts a block diagram of an example of a system for providing intelligent workspace connection assistance, according to some embodiments.

FIG. 2 depicts a block diagram of an example of a system for providing intelligent workspace connection assistance. In some embodiments, system 200 may include IHS 100 coupled to integrated peripheral devices 202 and external, workspace peripherals 203. To enable intelligent workspace connections operations, IHS 100 may also be coupled to remote services (or "backend") 204 via Application Programming Interface (API) 205 (e.g., a Representational State Transfer or "REST" API, or the like), over a network (e.g., the Internet).

Within IHS 100, kernel space includes: OS inbox drivers 207, communications stack 208, and other OS modules 209. Moreover, user space includes: video shim module 210, audio shim module 211, Human Interface Device (HID) shim module 212, composite device shim module 213 (e.g., for interfacing with devices containing multiple ports, such as a docking station, hub, display, etc.), device discovery plugin 214, connection discovery plugin 215, connection orchestration plugin 216, workspace power budget plugin 217, and notification plugin 318, as well as agent and command router 219.

As part of remote services 204, cloud service 220 is coupled to workspace database 221, ordering console 222, ordering system 223, and order inventory database 224.

The various modules and plugins may be coupled as shown, and may be configured to perform operations described below.

For example, device discovery plugin 214 may be responsible for discovering peripheral devices connected to a workspace (statically and dynamically connected peripherals), such as docks, webcam, audio devices etc.

Connection discovery plugin 215 may be responsible for discovering existing connection across a workspace (e.g., a webcam connected to laptop over USB-A connection, a display connected over HDMI port via a dock, etc.).

Connection orchestrator plugin 216 may be responsible for orchestrating connections (e.g., USB 2.0, USB 3.0, HDMI etc.) across a workspace.

Workspace power budget plugin 217 may be responsible for calculating the power budget at multiple aggregated device levels (e.g., docking station, audio puck with a second hub connected to a dock with a first hub, etc.).

Notification plugin 218 may be responsible for handling user notifications.

Agent and command router 219 may be responsible for loading all of the aforementioned modules and plugins, and for handling incoming and outgoing events from and to cloud service 220.

Shim modules 210-213 may be responsible for handling all device-level abstractions or generalizations.

Cloud service 220 may be responsible for handling and/or selecting workspace connection configurations based upon data stored in workspace database 221, ordering subsystem 222-224.

Figure 3:
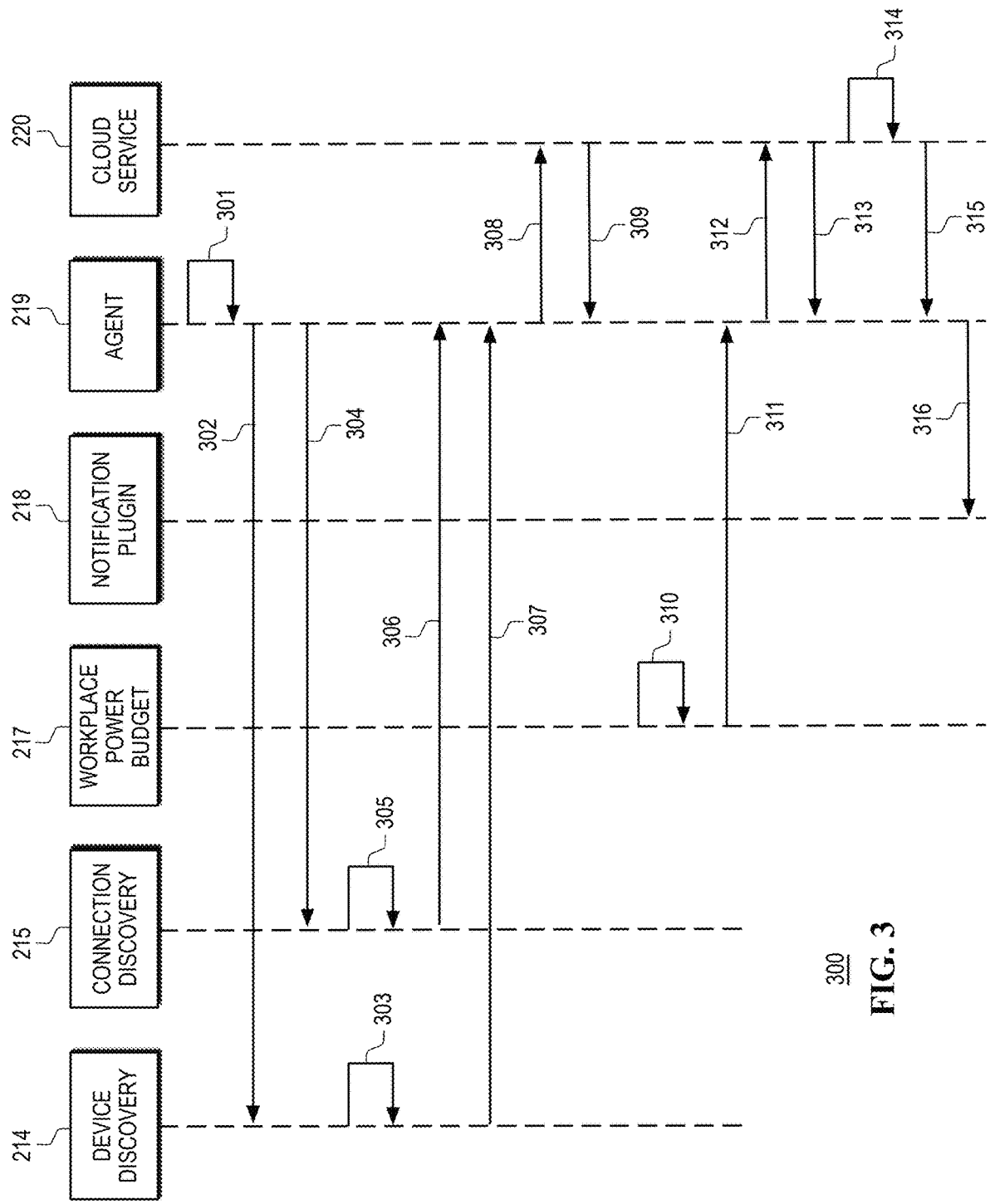
FIG. 3 depicts a sequence diagram of an example of a method for providing intelligent workspace connection assistance, according to some embodiments.

FIG. 3 depicts a sequence diagram of an example of a method for providing intelligent workspace connection assistance, according to some embodiments. Particularly, in this example, agent and command router 219 starts at 301, and it sends command or message 302 to device discovery module 214 to discover devices in a workspace where IHS 100 is disposed. Agent and command router 219 also sends another command or message 304 to connection orchestrator module 216 to discover connections in the workspace.

At 305, connection discovery module 215 discovers connections in the workspace and at 306 it sends agent and command router 219 a command or message to agent and command router 219 indicating the discovered connection information. Similarly, at 307, device discovery module sends discovered device information 307 to agent and command router 219.

At 308, agent and command router 219 sends connection and/or device information to cloud service 220, and it receives an acknowledgement or success indication at 309. At 310, workspace power budget module 217 calculates power budget 310, and it provides power budget information 311 to agent and command router 219. Agent and command router 219 sends the power budget information to cloud service 220 at 312, and it receives another acknowledgement or success indication at 313.

At 314, cloud service 220 triggers a connection recalculation based upon the information received from agent and command router 219, and well as other information stored in workspace database 221. At 315, cloud service 220 sends a connection recommendation resulting from recalculation operation 314 to agent and command router 219, and notification plugin 218 notifies the user of IHS 100 of the recommendation at 316.

Although in this example workspace power budget module 217 is shown as calculating power budget 310, in other embodiments other Key Performance Indicators (KPIs) may be used (e.g., bandwidth, performance, frequency of connections or disconnections, etc.). For example, in such embodiments, a workspace bandwidth budget module may replace module 217 to calculate a bandwidth budget instead, which in turn may be used by cloud service 220 to recalculate connections at 314. In yet other embodiments, two or more distinct KPIs may be used.

In sum, upon the booting of IHS 100, agent and command router 219 may load all relevant plugins and modules. Discovery plugins 214 and 215 may provide indications of devices connected to the workspace and of all available connections (e.g., a connection inventory which includes all available ports, ports to which devices are connected, bandwidth handshakes between a given port and a connected device, connection capabilities, etc.), which may in turn be cached locally and then sent to cloud service 220.

To illustrate the foregoing, consider the following illustrative, non-limiting examples A-C of connection inventory data produced by discovery plugins 214 and/or 215, here provided in JavaScript Object Notation (JSON) format:

```
A. Laptop Example:
{
"deviceType": "Laptop", "deviceModel": "LATITUDE 5520",
"deviceServiceTag": "SDFKJB4", "deviceUniqueId": "skjdbfu897",
    "ExternalPortDetails" : { "USBPort01" : {
    "PortUniqueId": "USBPort01", "Location": {
    "X": "Left",
    "Y": "Bottom",
    "Ordinal": "1", "Description":"1st USB-C Port"
    },
    "ConnectorType": "USB-Type-C",
    "Capabilities": { "Power": {
    "Source": "30W",
    "Sink": "90W" },
    "Speed": {
    "Max" : "10 Gbps", "CurrentAvailable": "8 Gbps"
```

```
}
},
"PortInUse": "Yes", },
"HDMIPort01" : { "PortUniqueId": "HDMIPort01",
"Location": { "X": "Right",
"Y": "Bottom",
"Ordinal": "2", "Description":"1st HDMI Port"
},
"ConnectorType": "HDMI",
"Capabilities": { "Power": {
"Source": "100W",
"Sink": "90W" },
"Speed": {
"Max" : "10 Gbps","CurrentAvailable": "8 Gbps" }
},"PortInUse": "Yes",
}
}
}
B. Webcam Example:
{
"deviceType": "Webcam",
"deviceModel": "DELL ULTRASHARP Webcam - WB7022",
"deviceServiceTag": "SV5SWB4",
"deviceUniqueId": "b34gku897",
"ExternalPorts" : {
"SupportedConnectivity" : ["USB"],
"USB" : { }
},
"ExternalPortDetails" : {
"BaseIDPrefix" : "USBPort", "AvailablePorts" : "1"
"USBPort01" : {
"PortUniqueId": "USBPort01",
"Location": {
"X": "Back",
"Y": "Top",
"Ordinal": "1", "Description":"USB 3.0 cable"
},
"ConnectorType": "USB-3.0-A", "Capabilities": {
"Power": { },
"Speed": {
"Source": "0W", "Sink": "4.5W"
"Max" : "4.8 Gbps", "CurrentAvailable": "0"
},
"Direction": "Transmitter", "MobilityPreference": "Fixed"
},
"PortInUse": "No",
}
}
}
C. WMD or Docking Station Example:
{
"deviceType": "Dock",
"deviceModel": "DELL WD19S USB Type-C Dock with 180W Power Adapter",
"deviceServiceTag": "SV5HJB4",
"deviceUniqueId": "n87gku897",
"ExternalPorts" : {
"SupportedConnectivity" : ["USB", "HDMI", "DisplayPort", "WiredEthernet"], "USB"
: {
},
"HDMI" : {
"BaseIDPrefix" : "USBPort", "AvailablePorts" : "5"
"BaseIDPrefix" : "HDMIPort", "AvailablePorts" : "1"
},
"DisplayPort" : {
"BaseIDPrefix" : "DP", "AvailablePorts" : "2"
},
"WiredEthernet" : {
"BaseIDPrefix" : "Eth", "AvailablePorts" : "1"
}
},
"ExternalPortDetails" : {
"HDMIPort01" : {
"PortUniqueId": "HDMIPort01",
"Location": {
"X": "Back",
"Y": "Top",
"Ordinal": "1",
"Description":"1st HDMI Port at backside"
},
```

-continued

```
"ConnectorType": "HDMI-A-2.1a", "Capabilities": {
"Speed": {
"Max" : "48 Gbps", "CurrentAvailable": "48 Gbps"
},
"Direction": "Transmitter"
},
"PortInUse": "No",
}
}
}
```

With respect to the first hypothetical situation described above (e.g., new workspace setup connection assist, first time calibration, re-calibration, etc.), for example, connection orchestrator plugin 216 may enumerate the workspace devices from the cloud service 220 backend 204. Based on the connection inventory, available ports may be enumerated on the device.

Connection orchestrator plugin 216 may provide a connection recommendation to the user of IHS 100 using notification plugin 218. Once a device gets connected to the workspace, agent and command router 219 may re-enumerate all the devices and connections. After the enumeration of devices and connections, connection orchestrator plugin 216 analyzes the connected peripherals and their interfaces.

All static devices such as displays, webcams, speakerphones, etc. may be determined based on the ports to which they are respectively connected, and reconnection recommendations may be identified, for example, based on the calculations described below.

These recommendations may be sent or displayed to the user or Information Technology (IT) personnel as notifications (e.g., dialog boxes in the IHS's Graphical User Interface or "GUI," emails, etc.), using notification plugin 218.

For sake of illustration, an example of such connection recommendation is shown in Table I below:

TABLE I

New Workspace Setup Connection Assist

| Workspace Devices | Existing Connection | Sample Connection Recommendation |
|---|---|---|
| Laptop with 1 USB-C USB-C Monitor USB-C speakerphone Bluetooth Keyboard/Mouse with USB transceiver USB-A Webcam | None | Laptop connected to USB-C speakerphone Monitor behind USB-C speakerphone USB webcam behind speakerphone USB transceiver connected to laptop |

With respect to the second hypothetical situation described above (e.g., new peripheral on-boarding assistance, pre- and post-connection assistance, etc.), in some cases, based upon an "Out for Delivery" event for the new peripheral device obtained through ordering subsystem 222-224, agent and command router 219 may get new peripheral details (e.g., capabilities and connectivity details) from cloud service 220.

Connection orchestrator plugin 216 may enumerate the workspace and find the available ports. If there are free ports in a given device (e.g., a dock), connection orchestrator plugin 216 may calculate the re-enumerated connections and cache them locally. Once the new peripheral device arrives, connection orchestrator plugin 216 may provide a connection recommendation using notification plugin 218.

After the user connects the new peripheral device, connection orchestrator plugin 216 may re-enumerate the connected devices in the workspace. If there are static devices that can be recalibrated to connect behind a dock, for example, a new recommendation may be provided.

For sake of illustration, an example of such recommendations is shown in Table II below:

TABLE II

New Peripheral On-Boarding Assist

| Workspace Devices | Existing Connection | Sample Connection Recommendation |
|---|---|---|
| Laptop with 1 USB-C USB-C Monitor USB-C Speaker phone Bluetooth Keyboard/Mouse with USB transceiver USB-A Webcam New peripheral - HDMI Monitor | Laptop connected to USB-C Speaker phone Monitor behind USB-C Speaker phone USB-A webcam behind Speaker phone USB transceiver connected to laptop | Laptop connected to USB-C speakerphone Monitor behind USB-C speakerphone USB transceiver connected to laptop. HDMI Monitor connected to speakerphone USB webcam behind HDMI Monitor |

With respect to the third and fourth hypothetical situations described above (e.g., connection assist based on peripheral usage and/or power budget, etc.), connection orchestrator plugin 216 may run periodically and enumerate devices and connections in the workspace. Based on the usage pattern of the workspace peripherals, connection orchestrator plugin 216 may run the connection recommendation algorithm and propose connection assistance using notifications.

For example, if there are USB devices (e.g., USB pen drive, USB-based debuggers, etc.) being connected/disconnected multiple times in a particular workspace, having these devices connected to IHS 100 directly and/or having free USB ports on IHS 100 may be determined to be a better connectivity model. Connection orchestrator plugin 216 may enumerate these connection recommendations and post them to the user as notifications, for example, as shown in Tables III and IV below:

TABLE III

Connection Assist Based on Peripheral Usage

| Workspace Devices | Existing Connection | Sample Connection Recommendation |
|---|---|---|
| Laptop with 1 USB-C USB-C Monitor USB-C speakerphone Bluetooth Keyboard/Mouse with USB transceiver USB-A Webcam | Laptop connected to USB-C speakerphone Monitor behind USB-C speakerphone USB transceiver connected to laptop HDMI Monitor | Laptop connected to USB-C Speaker phone. Monitor behind USB-C Speaker phone. USB transceiver moved to Speaker phone USB webcam behind |

TABLE III-continued

Connection Assist Based on Peripheral Usage

| Workspace Devices | Existing Connection | Sample Connection Recommendation |
|---|---|---|
| New peripheral - HDMI Monitor USB pen-drive connect/removal | connected to speakerphone USB webcam behind HDMI Monitor | HDMI Monitor Laptop USB ports kept open for connecting frequently used USB devices |

TABLE IV

Connection Assist Based on Power Budget

| Workspace Devices | Existing Connection | Sample Connection Recommendation |
|---|---|---|
| Laptop with 1 USB-C USB-C Monitor 1 USB-C Docking station USB-C Monitor 2 HDMI Monitor | Laptop connected to USB-C Docking station. USB-C Monitor 1 connected to laptop USB-C Monitor 2 connected to docking station HDMI Monitor connected to laptop | Laptop connected to USB-C Docking station USB-C Monitor 1 and 2 connected dock HDMI monitor moved to dock |

In addition to providing direct port availability, in the fourth hypothetical situation described above, connection orchestrator plugin 216 may also enumerate the ports behind composite devices and provide additional connection recommendations (i.e., an extension of the first and second hypothetical situations). Particularly, an external monitor downstream port, for example, may also be considered while providing the port connection recommendations.

In some cases, smart peripherals having their own version of agent and command router 219 and connection orchestrator plugin 216 may be available to cloud services 220 for better device and/or connection recommendations in the workspace.

Figure 4:
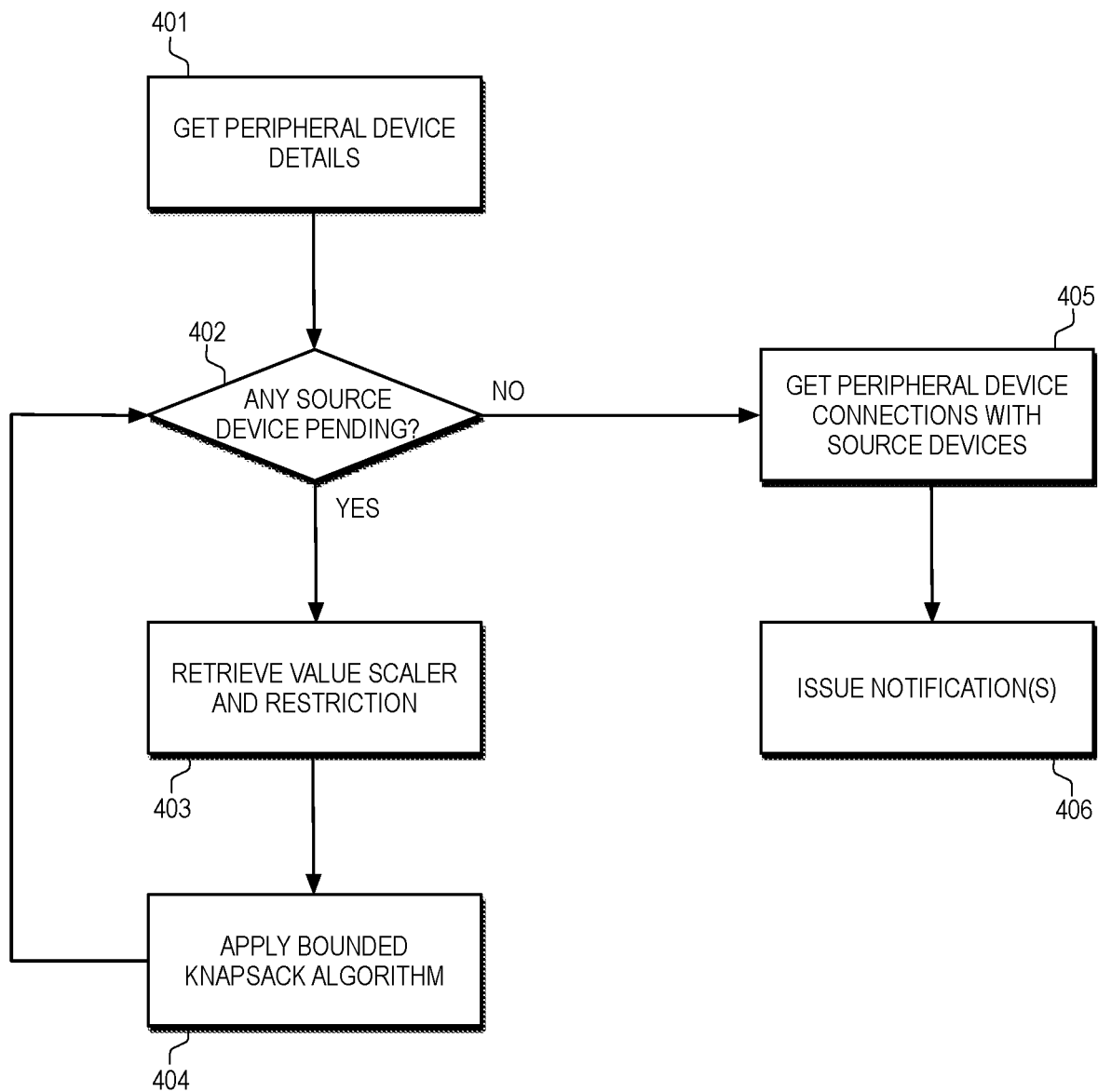
FIG. 4 depicts a flowchart of an example of a method for providing intelligent workspace connection assistance, according to some embodiments.

FIG. 4 depicts a flowchart of an example of method 400 for providing intelligent workspace connection assistance. In various embodiments, method 400 may be performed, at least in part, through the instantiation of agents, modules, plugins, and service shown in FIG. 2 by one or more IHSs 100. Particularly, at 401 method 400 may get peripheral device details (e.g., ports, connections, daisy chain connections, bandwidth, power consumption, etc.) and/or capabilities (e.g., USB 2/3, USB C: 4K (3840×2160), VGA, DVI, HDMI: 4K (3840×2160) @ 60 Hz, DISPLAYPORT ports, 3.5 mm audio jack, etc.). At 402, if a source device (e.g., IHS 100, docking station, display, etc.) is still awaiting its evaluation, control passes to 403.

As used herein, the term "source device" refers to any device, whether IHS 100 and/or a peripheral device, with ports having a receive (Rx) direction (e.g., dock, laptop, etc.).

At 403, method 400 retrieves a value scaler and/or restriction value for the source device (e.g., from workspace database 221 through cloud service 220). At 404, method 400 applies a bounded knapsack algorithm, as described below, before control returns 402.

Back at 402, if the last source device has been evaluated, then control passes to 405. At 405, method 400 gest peripheral device connections with source devices. Then, at 406, method 400 issues a connection or reconnection recommendation for one or more peripheral devices and/or ports.

Referring now to block 404, the bounded knapsack algorithm may be configured to select device that provide a maximum value after a scaling operation. The value after scaling (i.e., $v_i * v_{si}$) may include one or more KPIs based on multiple factors, such as mobility preferences (e.g., a printer's connection to a USB ports should be seldom removed, unlike pen-drives; device features such as 4K resolution in a webcam, automatic notice cancellation in a headset, etc.).

A mathematical expression usable to execute such a suitable knapsack algorithm may be as follows:

$$\max \sum_{i=1}^{n} v_i v s_i x_i$$

where:

n represents the total number of devices in the workspace (connected and new);

$v_i$ represents a KPI value of a specific device 'i'; and $v_{si}$ represents a value scaler or multiple of a corresponding device 'i' (based on the source device—dock, laptop, . . . ).

Moreover, the knapsack algorithm may be bounded as follows:

$$\sum_{i=1}^{n} w_i x_i \le C$$

where:

$w_i$ represents a weight of the specific device 'i' (based on requirements such as power, bandwidth, etc.);

$x_i$ represents a restriction value (e.g., "0" if the device is rejected or "1" if the device is selected) for specific device 'i.' In some cases, the restriction value may be selected based upon whether the connecting peripheral device and the source or host device have a common supported connectivity and connector type (please see JSON examples above); and C represents a maximum collective weight limit of a source device.

For sake of illustration, Table V provides examples of value scalers and restriction values for various source devices and conditions:

TABLE V

Examples of Scaler and Restriction Values Based Upon Device Ports and Mobility Preferences

| Source Devices | Connecting Device Condition | Value Scaler (vs: Range: 0-2 in floating val) | Restriction (x: Range: 0-1) |
|---|---|---|---|
| Dock/ Desktop/ Monitor (with integrated USB Hub) | Device not having any Transmitter ports | 0 | 0 |
| | PortDirection = Tx & MobilityPreference = Fixed | 2 | 1 |
| | PortDirection = Tx & MobilityPreference = Mobile | 0.25 | 1 |
| Laptop | Device not having any Transmitter ports | 0 | 0 |
| | PortDirection = Tx & MobilityPreference = Fixed | 0.25 | 1 |
| | PortDirection = Tx & MobilityPreference = Mobile | 2 | 1 |

Table VI shows examples of maximum KPI values or weights for different source devices:

TABLE VI

Examples of Maximum KPI Values/Weights for Source Devices

| Source Devices | Max Power Weight ($C_p$) | Max Bandwidth Weight ($C_{bw}$) |
| --- | --- | --- |
| Dock | 90 W | 110 W |
| Desktop | 80 W | 70 W |
| Monitor (with USB Hub) | 20 W | 25 W |

Still referring to method 400, as part of the process of calculating a power budget available on connected composite peripherals (e.g., dock, USB speakerphone, etc.), for example, the total power available for a particular dock may be 180 W. In that case, method 400 may enumerate the devices connected to the composite peripheral and calculate the power requirement for connected devices.

When a new USB peripheral is discovered, for example, method 400 may enumerate the new peripheral capabilities (e.g., USB C/A, 4K UHD webcam, power requirement, etc.). Method 400 may check for available ports in the workspace matching connection, capability, and power requirements; and it may also check for static connections (e.g., monitor, USB transceivers, etc.). If there are available ports behind dock, a device swapping recommendation may be issued.

If there are available ports, method 400 may provide a recommendation to re-connect the new peripheral if not connected to the best performing port (e.g., a high-definition USB Camera connected to a USB 2.0 port may lead to issues).

If the available ports are occupied, method 400 may check for a matching port (e.g., in the case of USB-C with good power budget, connected device with matching/mismatching capabilities, port match, bandwidth match, meeting the power budget, etc.), recommend a swapping of devices across different ports.

In sum, systems and methods described herein provide intelligent workspace connection assistance. In various embodiments, these systems and methods may recommend device connections for peripherals and IHS 100 for better connectivity and performance in a user's workspace based upon one or more of: a workspace's ecosystem (e.g., IHS, peripherals etc.), connection capabilities (e.g., speed, connector-type, power budget, etc.), and/or the present connection mapping. These systems and methods may also assess and identify an entire workspace ecosystem's capabilities (ports, port-capability/speed/bandwidth, power), and provide a holistic connection recommendation for better user-experience in various use-cases, such as: workspace and/or peripheral setup, new IHS/peripheral ordering, on-boarding, workspace and peripheral usage, etc.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
enumerate a plurality of peripheral devices coupled to a plurality of ports of the IHS;
identify a Key Performance Indicator (KPI) for each of the plurality of peripheral devices, wherein the KPI comprises at least one of: a power consumption or a communication bandwidth;
weigh each of the KPIs by a corresponding value scaler; and
calculate a connection recommendation for the plurality of peripheral devices based, at least in part, upon the weighed KPIs.

2. The IHS of claim 1, wherein the plurality of peripheral devices comprises at least one of: a docking station, a display, a projector, a camera, a microphone, a loudspeaker, headphones, a keyboard, a mouse, a scanner, a printer, a smartwatch, a smartphone, or a tablet.

3. The IHS of claim 1, wherein the plurality of ports comprises at least one of: Universal Serial Bus (USB) Type-A, USB Type-B, USB Type-C, Lightning, Firewire, Thunderbolt, DisplayPort, High-Definition Multimedia Interface (HDMI), Digital Visual Interface (DVI), or Serial Advanced Technology Attachment (SATA).

4. The IHS of claim 1, wherein to enumerate the plurality of peripheral devices, the program instructions, upon execution, further cause the IHS to discover at least one single composite peripheral device comprising two or more of the plurality of ports.

5. The IHS of claim 4, wherein the composite peripheral device comprises at least one of: a docking station, a display, or a hub.

6. The IHS of claim 1, wherein the value scaler for each corresponding one of the plurality of devices comprises a metric indicative of at least one of: a number of available ports, a port direction, or a mobility preference.

7. The IHS of claim 1, wherein to calculate the connection recommendation, the program instructions, upon execution, further cause the IHS to perform a knapsack algorithm using the weighed KPIs.

8. The IHS of claim 7, wherein the knapsack algorithm is bounded by a maximum KPI value for the connection recommendation.

9. The IHS of claim 1, wherein the connection recommendation comprises an instruction to decouple a first peripheral device from a first port and to couple the first peripheral device to a second port.

10. The IHS of claim 9, wherein the connection recommendation comprises an instruction to decouple a second peripheral device from the second port and to couple the second peripheral device to the first port.

11. The IHS of claim 1, wherein the program instructions, upon execution, cause the IHS to:
enumerate another plurality of peripheral devices in response to an addition of a new peripheral device or removal of an existing peripheral device from the plurality of peripheral devices; and
calculate another connection recommendation for the other plurality of peripheral devices based, at least in part, upon at least one other weighed KPI.

12. The IHS of claim 1, wherein the connection recommendation comprises a suggestion to replace a first peripheral device with a second peripheral device of a same type of as the first peripheral device, and wherein the first and second peripheral devices are coupled to the IHS using different ports.

13. A method, comprising:
identifying a Key Performance Indicator (KPI) for each of a plurality of peripheral devices coupled to a plurality of ports of an Information Handling System (IHS), wherein the KPI comprises at least one of: a power consumption or a communication bandwidth; and
calculating a connection recommendation for the plurality of peripheral devices based, at least in part, upon the KPIs weighed by corresponding value scalers.

14. The method of claim 13, wherein each value scaler, for each of the plurality of peripheral devices, comprises a metric indicative of at least one of: a number of available ports, a port direction, or a mobility preference.

15. The method of claim 13, wherein calculating the connection recommendation comprises performing a knapsack algorithm using the weighed KPIs.

16. The method of claim 13, wherein the knapsack algorithm is bounded by a maximum KPI value.

17. A memory storage device having program instructions stored thereon that, upon execution by an Information Handling System (IHS), cause the IHS to:
identify a Key Performance Indicator (KPI) for each of a plurality of peripheral devices coupled to a plurality of ports of the IHS, wherein the KPI comprises at least one of: a power consumption, or a communication bandwidth; and
calculate a connection recommendation for the plurality of peripheral devices based, at least in part, upon the KPIs weighed by corresponding value scalers.

18. The memory storage device of claim 17, wherein each value scaler, for each of the plurality of peripheral devices, comprises a metric indicative of at least one of: a number of available ports, a port direction, or a mobility preference.

19. The memory storage device of claim 17, wherein to calculate the connection recommendation, the program instructions, upon execution, further cause the IHS to perform a knapsack algorithm using the weighed KPIs and bounded by a maximum KPI value.

* * * * *